United States Patent
Talley et al.

(10) Patent No.: US 9,609,518 B1
(45) Date of Patent: Mar. 28, 2017

(54) METHODS AND SYSTEM FOR CHANGING MOBILE STATION SETTINGS UPON HAND-OFF TO LOW-COST INTERNET BASE STATION

(75) Inventors: Ryan S. Talley, Overland Park, KS (US); Christopher M. Yenney, Ashburn, VA (US)

(73) Assignee: Spring Spectrum L.P., Overland Park, KS (US)

( * ) Notice: Subject to any disclaimer, the term of this patent is extended or adjusted under 35 U.S.C. 154(b) by 2379 days.

(21) Appl. No.: 12/354,512

(22) Filed: Jan. 15, 2009

(51) Int. Cl.
| | |
|---|---|
| *H04Q 7/00* | (2006.01) |
| *H04W 12/12* | (2009.01) |
| *H04W 36/30* | (2009.01) |
| *H04W 36/18* | (2009.01) |
| *H04W 36/32* | (2009.01) |

(52) U.S. Cl.
CPC ........... *H04W 12/12* (2013.01); *H04W 36/18* (2013.01); *H04W 36/30* (2013.01); *H04W 36/32* (2013.01)

(58) Field of Classification Search
CPC ..... H04W 12/06; H04W 12/08; H04W 36/00; H04M 1/65
USPC .... 455/410, 437, 436, 440, 443, 411, 412.1, 455/412.2, 434, 435.1, 435.2, 438; 370/328–331
See application file for complete search history.

(56) References Cited

U.S. PATENT DOCUMENTS

| | | | | |
|---|---|---|---|---|
| 8,155,282 | B2 * | 4/2012 | Thaper et al. | 379/88.18 |
| 2006/0135123 | A1 * | 6/2006 | Jo | 455/410 |
| 2009/0061827 | A1 * | 3/2009 | Bulgin et al. | 455/413 |
| 2009/0093234 | A1 * | 4/2009 | Cai et al. | 455/411 |
| 2010/0157891 | A1 * | 6/2010 | Mikan et al. | 370/328 |

* cited by examiner

*Primary Examiner* — Kathy Wang-Hurst
*Assistant Examiner* — Julia Perez

(57) ABSTRACT

Methods and systems are provided for changing mobile-station settings upon a mobile station handing off to a base station. In an embodiment, a base station makes a first determination that at least one of several enumerated events has occurred, and in response to making the first determination, carries out one or more of several enumerated steps. Among the several enumerated events are (i) a mobile station handing off to the base station, and (ii) the mobile station initiating a call to a voicemail system maintaining a voicemail account associated with the mobile station; and among the several enumerated steps are (i) disabling a password requirement for the voicemail account, (ii) conveying a voicemail password to the voicemail system on behalf of the mobile station, and (iii) configuring the mobile station to convey the voicemail password to the voicemail system upon the mobile station establishing a call to the voicemail system.

20 Claims, 6 Drawing Sheets

METHODS AND SYSTEM FOR CHANGING MOBILE STATION SETTINGS UPON HAND-OFF TO LOW-COST INTERNET BASE STATION

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (Wi-Fi)) router. That router may include one or more Ethernet ports to which computers or other devices may be connected, and may also include wireless-access-point functionality, providing a Wi-Fi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or Wi-Fi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. Wi-Fi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (e.g. CDMA and EV-DO) are supported), and also transmit what is known as a pilot beacon, which includes administrative messages and parameters that mobile stations use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for changing mobile-station settings upon a mobile station handing off to a base station. In an embodiment, a base station makes a first determination that at least one of several enumerated events has occurred, and in response to making the first determination, carries out one or more of several enumerated steps. Among the several enumerated events are (i) a mobile station handing off to the base station, and (ii) the mobile station initiating a call to a voicemail system maintaining a voicemail account associated with the mobile station; and among the several enumerated steps are (i) disabling a password requirement for the voicemail account, (ii) conveying a voicemail password to the voicemail system on behalf of the mobile station, and (iii) configuring the mobile station to convey the voicemail password to the voicemail system upon the mobile station establishing a call to the voicemail system.

Another embodiment comprises making a determination that a mobile station has handed off to a Low-Cost Internet Base Station, and in response to making the determination, changing one or more user-interface settings on the mobile station.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Overview

Figure 1:
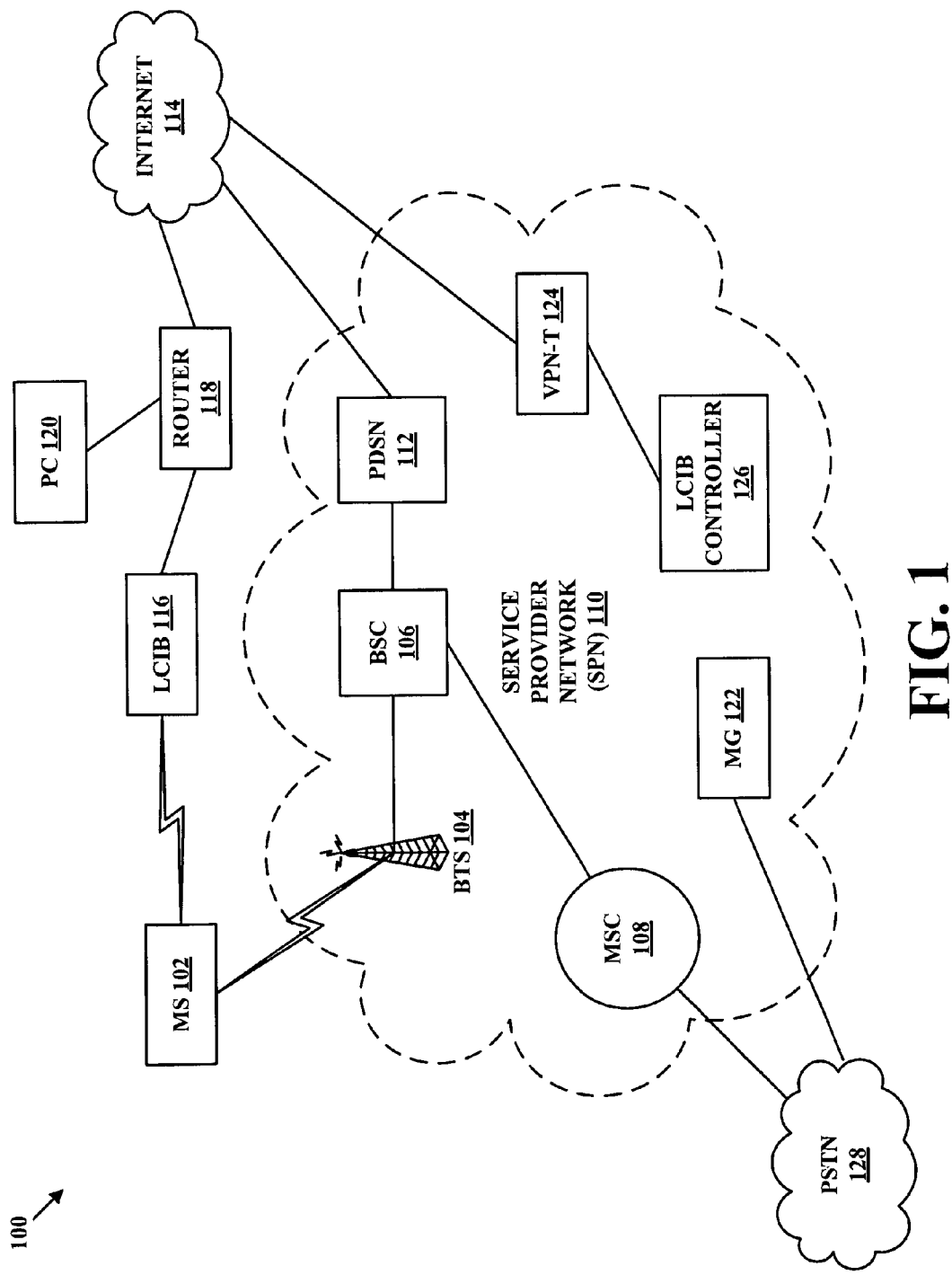
FIG. 1 is a simplified block diagram of a communication system, in accordance with exemplary embodiments.

When a mobile station hands off to a base station (for example, an LCIB), it may be desirable to change certain settings on the mobile station. This is because certain features may no longer be necessary or desirable while the mobile station is associated with a particular base station, or because certain features may become necessary while the mobile station is associated with the particular base station.

A feature that may be unnecessary while a mobile station is associated with a particular base station is a voicemail password. Generally, a mobile-station user may want to protect a voicemail account from unauthorized access by requiring a password (typically four or more dialed digits) to access the voicemail account. However, while a mobile station is associated with a particular base station—for example, an LCIB—the mobile-station user may not want to enter a voicemail password when accessing the voicemail account. This may be because the mobile-station user knows or trusts that, so long as the mobile station is associated with the particular base station, no other person will attempt to establish a call from the mobile station to the voicemail account associated with the mobile station.

The user may know or trust that no other person will attempt to establish a call to the voicemail account because the mobile station is associated with an LCIB in the user's home, and therefore no other person has access to the mobile station, or only trusted family members have access to the mobile station. Or the user may know or trust that no other person will attempt to establish such a call because the mobile station is associated with a base station—perhaps a campus base station or an LCIB—at the user's office, and therefore other coworkers are unlikely to misappropriate the user's mobile station and attempt to establish such a call from the mobile station.

It may also be desirable to change other settings when a mobile station hands off to an LCIB, such as, but not limited to, a ringtone setting, a volume setting, a wireless-protocol setting, and/or a GPS setting. For example, enabling or disabling a wireless-protocol setting upon a mobile station handing off to an LCIB may allow use of certain wireless protocols that have lower power requirements, but cannot otherwise operate with a macro base station (for example, Wi-Fi). As another example, disabling a GPS interface on the mobile station upon the mobile station handing off to an LCIB may allow the mobile station to consume less power, thereby preserving the battery life of the mobile station. Additionally, a GPS interface may be unnecessary while the mobile station is served by the LCIB. The mobile station may be able to detect the current location using a GPS interface on the LCIB. Moreover, because an LCIB serves a smaller geographic area than a macro base station, the mobile-station user will likely know his or her present location while the mobile station is served by the LCIB.

Among the focuses of the present invention is for a base station to make a first determination that at least one of several enumerated events has occurred, and in response to making the first determination, carry out one or more of several enumerated steps. Among the several enumerated events are (i) a mobile station handing off to the base station, and (ii) the mobile station initiating a call to a voicemail system maintaining a voicemail account associated with the mobile station; and among the several enumerated steps are (i) disabling a password requirement for the voicemail account, (ii) conveying a voicemail password to the voicemail system on behalf of the mobile station, and (iii) configuring the mobile station to convey the voicemail password to the voicemail system upon the mobile station establishing a call to the voicemail system.

Disabling the password requirement may, for example, take the form of the LCIB establishing a call to the voicemail system and transmitting one or more key inputs to the voicemail system. Additionally or alternatively, disabling the password requirement may take the form of the LCIB sending a message to a network entity to disable the password requirement. Those having skill in the art will recognize that other methods of disabling the password requirement are possible without departing from the scope of the claims.

The LCIB may also optionally receive a voicemail password. Receiving the voicemail password may take the form of, among other possibilities, receiving the voicemail password from the mobile station; receiving the voicemail password from the mobile station may further take the form of receiving dialed digits representing the voicemail password. Additionally or alternatively, receiving the voicemail password may take the form of receiving the voicemail password from a data storage connected to the base station. Those having skill in the art will recognize that other methods of receiving a voicemail password are possible without departing from the scope of the claims.

The invention may also make a second determination that the mobile station has handed off away from the base station, and in response to making the second determination, carry out one or more of several enumerated steps. Among the several enumerated steps are (i) enabling the password requirement for the voicemail account and (ii) configuring the mobile station to not convey the voicemail password to the voicemail system upon establishing a call to the voicemail system.

Enabling the password requirement may, for example, take the form of the LCIB establishing a call to the voicemail system and transmitting one or more key inputs to the voicemail system. Additionally or alternatively, enabling the password requirement may take the form of the LCIB sending a message to a network entity to enable the password requirement. Those having skill in the art will recognize that other methods of enabling the password requirement are possible without departing from the scope of the claims.

In another embodiment, the invention may make a determination that a mobile station has handed off to an LCIB, and in response to making the determination, change one or more user-interface settings of the mobile station. The user-interface settings may comprise, for example, a volume setting, a display-picture setting, a wireless-protocol setting, and/or a global-positioning-system (GPS) setting. Those having skill in the art will recognize that the user-interface setting may also comprise other user-interface settings, without departing from the scope of the claims.

It should be understood that all descriptions presented herein are exemplary in nature. Those having skill in the art will recognize that the invention may be carried out in any manner without departing from the scope of the claims. For example, there may be other techniques for determining that a mobile station has handed off to an LCIB, or that the mobile station has initiated a call to a voicemail system, without departing from the scope of the invention. Similarly, there may be other techniques for disabling a password requirement, conveying a voicemail password to the voicemail system on behalf of the mobile station, or configuring the mobile station to convey the voicemail password upon the mobile station establishing a call to the voicemail system, without departing from the scope of the invention.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a router 118, a personal computer (PC) 120, a media gateway 122, a VPN terminator (VPN-T) 124, an LCIB controller 126, a public switched telephone network (PSTN) 128, and an LCIB switch 130. Additional entities could be present, such as additional mobile stations in communication with BTS 104, additional entities in communication with Internet 114 and/or PSTN 128, etc. Also, there could be one or more devices and/or networks making up at least part of one or more communication links.

Mobile station 102 may be any mobile device arranged to carry out the mobile-station functions described herein. Mobile station 102 is further described in connection with FIG. 2.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more coverage areas such as cells and sectors, for communicating with mobile stations such as mobile station 102 over an air interface. The communication interface may also include one or more wired (e.g. Ethernet) and/or wireless (e.g. Wi-Fi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 122, PSTN 128, and LCIB switch 130. In general, MSC 108 acts as a switch between PSTN 128 and one or more BSCs (such as BSC 106) and/or one or more LCIB switches (such as LCIB switch 130), facilitating communication between mobile stations and PSTN 128, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, Internet 114, and VPN terminator 124. In general, PDSN 112 acts as a network access server between Internet 114 and BSCs (such as BSC 106) and/or VPN terminators (such as VPN terminator 124), facilitating packet-data communication between mobile stations and Internet 114, via macro base stations and LCIBs.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. LCIB 116 is further described in connection with FIG. 3.

Router 118 may be any communication device arranged to carry out the router functions described herein. As such, router 118 may include a communication interface, a processor, and data storage comprising instructions executable by the processor for carrying out those router functions. The communication interface may include one or more Ethernet ports, and may also include wireless-access-point functionality. Sometimes also referred to as a "residential gateway," the router facilitates, through IP routing and/or network address translation (NAT), communication between a wide area network such as the Internet 114, and any number computers or devices, including, for example, personal computer (PC) 120 (for example, a desktop or a laptop computer), digital video recorders, and/or appliances. The functions of LCIB 116 and router 118 may be combined into a single device.

Media gateway (MG) 122 may be any networking element arranged to carry out the media-gateway functions described herein. As such, MG 122 may include a communication interface, a processor, and data storage comprising instructions executable by the processor for carrying out those media-gateway functions. The communication interface may include a circuit-switched interface and a packet-switched interface. MG 122 may (a) receive packet-based communications from SPN 110, convert those to circuit-switched communications, and pass them to PSTN 128 and (b) receive circuit-switched communications from PSTN 128, convert those to packet-based communications, and pass them to SPN 110.

VPN terminator 124 may be any networking element arranged to carry out the VPN-terminator functions described herein. Thus, VPN terminator 124 may include a communication interface, a processor, and data storage comprising instructions executable by the processor for carrying out those VPN-terminator functions. The communication interface may include one or more wired and/or wireless interfaces for communicating with at least PSDN 112, Internet 114, MG 122, LCIB controller 126, and LCIB switch 130. In general, VPN terminator 124 functions to establish secure VPN connections over Internet 114 with LCIBs such as LCIB 116, enabling the LCIBs to securely communicate with devices on SPN 110, such as LCIB controller 126, and perhaps beyond.

LCIB controller 126 may be any networking element arranged to carry out the LCIB-controller functions described herein. Thus, LCIB controller 126 may include a communication interface, a processor, and data storage comprising instructions executable by the processor for carrying out those LCIB-controller functions. The communication interface may include one or more wired and/or wireless interfaces for communicating with at least VPN terminator 124, along with perhaps one or more other entities on service-provider network 110, and beyond.

Among other functions, LCIB controller 126 communicates via VPN terminator 124 with LCIBs such as LCIB 116. LCIB controller 126 may receive requests from various LCIBs for configuration data, and those requests may include, among other values, indications of the LCIBs' respective locations. LCIB controller 126 may also be operable to select various operational parameters for LCIBs (e.g. carrier, PN offset, whether to broadcast a pilot beacon, contents of any pilot beacon to be broadcast, transmission-power level), and to transmit those parameters to LCIBs, perhaps along with other configuration data and messaging.

LCIB switch 130 may be any networking element arranged to carry out the LCIB-switch functions described herein. As such, LCIB switch 130 may include a communication interface, a processor, and data storage comprising instructions executable by the processor for carrying out those LCIB-switch functions. The communication interface may include one or more wired and/or wireless interfaces for communicating with at least MSC 108 and VPN terminator 124. In general, LCIB switch 130 acts as a switch between MSC 108 and VPN terminator 124, enabling mobile stations communicating via LCIBs to engage in calls over PSTN 128 via MSC 108.

b. An Exemplary Mobile Station

Figure 2:
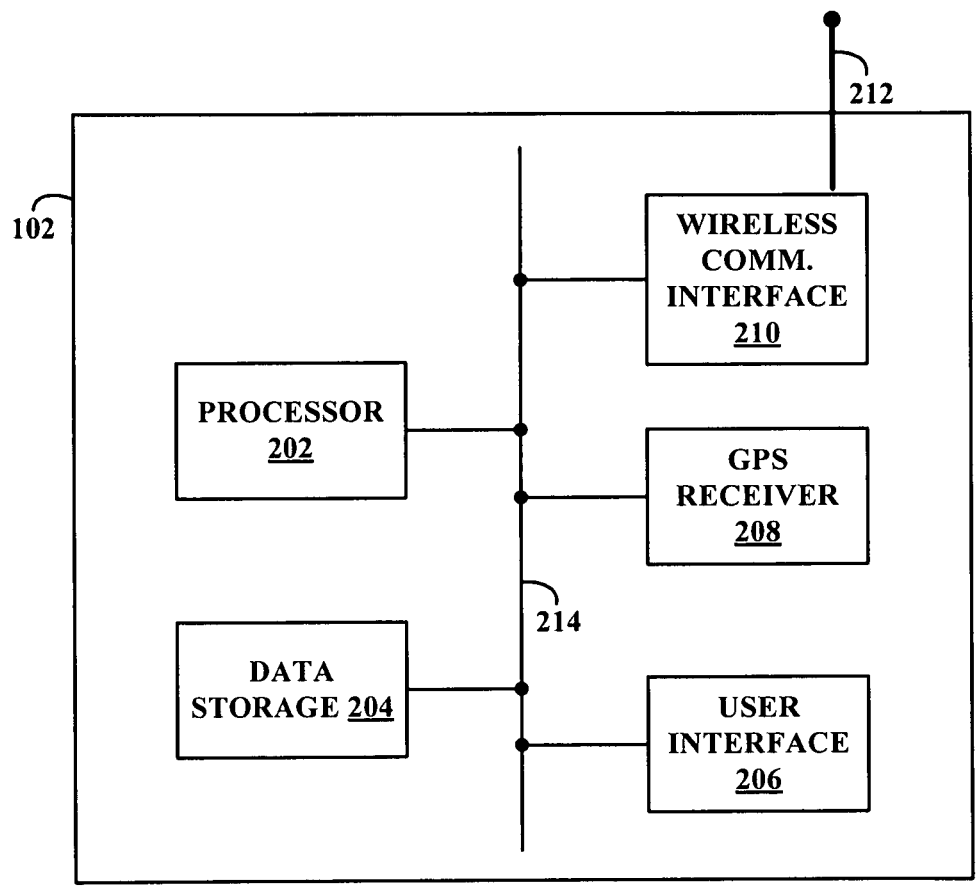
FIG. 2 is a simplified block diagram of a mobile station, in accordance with exemplary embodiments.

FIG. 2 is a simplified block diagram of an exemplary mobile station, which may be used in accordance with exemplary embodiments. As illustrated, mobile station 102 may include a processor 202, data storage 204, a user interface 206, and/or a wireless communication interface 210, all coupled together by a system bus 214. In addition, mobile station 102 may include a global positioning system (GPS) receiver 208, which may be any known or hereafter-developed GPS receiver, suitable for receiving and decoding GPS signals for location and timing purposes, perhaps among other purposes. Further, mobile station 102 may include any other mechanisms now known or later developed for such devices.

In an exemplary embodiment, processor 202 may be, for example, a general purpose microprocessor and/or a discrete signal processor. Though processor 202 is described here as a single processor, those having skill in the art will recognize that mobile station 102 may contain multiple (e.g., parallel) processors. Data storage 204 may store a set of machine-language instructions, which are executable by processor 202 to carry out various functions described herein. Alternatively, some or all of the functions could instead be implemented through hardware. In addition, data storage 204 may store various data to facilitate carrying out various functions described herein. In addition, data storage 204 may hold user-interface data, among many other possibilities. User interface 206 may function to facilitate interaction with a user of the mobile station. As such, user interface 206 may include a display, a speaker, a microphone, a key input, a touch-screen, and/or any other elements for receiving inputs and communicating outputs.

Wireless communication interface 210 may include a chipset suitable for communicating with one or more devices over antenna 212. Suitable devices may include, for example, LCIB 116 and/or router 118. The chipset could be suitable for CDMA communication. The chipset or wireless-communication interface 210 in general may also or instead be able to communicate with other types of networks and devices, such as EV-DO networks, Wi-Fi networks, Bluetooth devices, and/or one or more additional types of networks and devices.

c. An Exemplary LCIB

Figure 3:
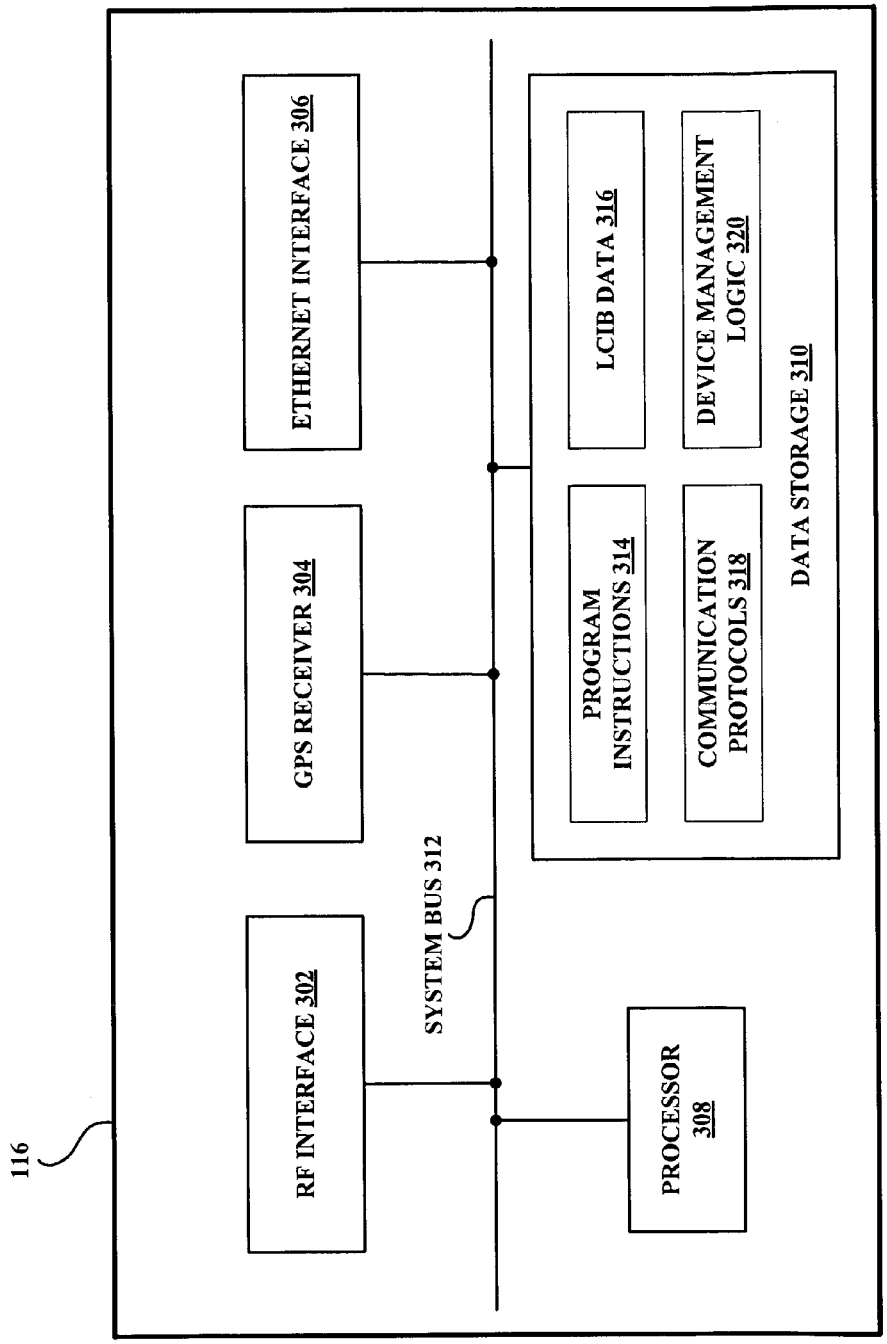
FIG. 3 is a simplified block diagram of a Low-Cost Internet Base Station, in accordance with exemplary embodiments.

FIG. 3 depicts an exemplary diagram of LCIB 116, which includes an RF interface 302, a GPS receiver 304, an Ethernet interface 306, a processor 308, and data storage 310, all communicatively linked by a system bus 312. Note that LCIB 116 could have additional and/or different components, and that this structure is provided by way of example.

RF interface 302 may include one or more antennas, one or more chipsets, a set of one or more channel elements, and/or one or more other components suitable for providing a wireless coverage area according to a wireless-communication protocol such as CDMA (and/or one or more other wireless technologies such as Wi-Fi). GPS receiver 304 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 306 may provide a wired packet-data interface for communicating with a device such as a router or cable modem. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the LCIB functions described herein, (b) LCIB data 316, which may be any operational data or other type of data stored for use by LCIB 116, such as a voicemail password, (c) communication protocols 318, facilitating and enabling communication with one or more other devices, and (d) device management logic 320, perhaps for memory and file management.

3. Exemplary Operation

Figure 4:
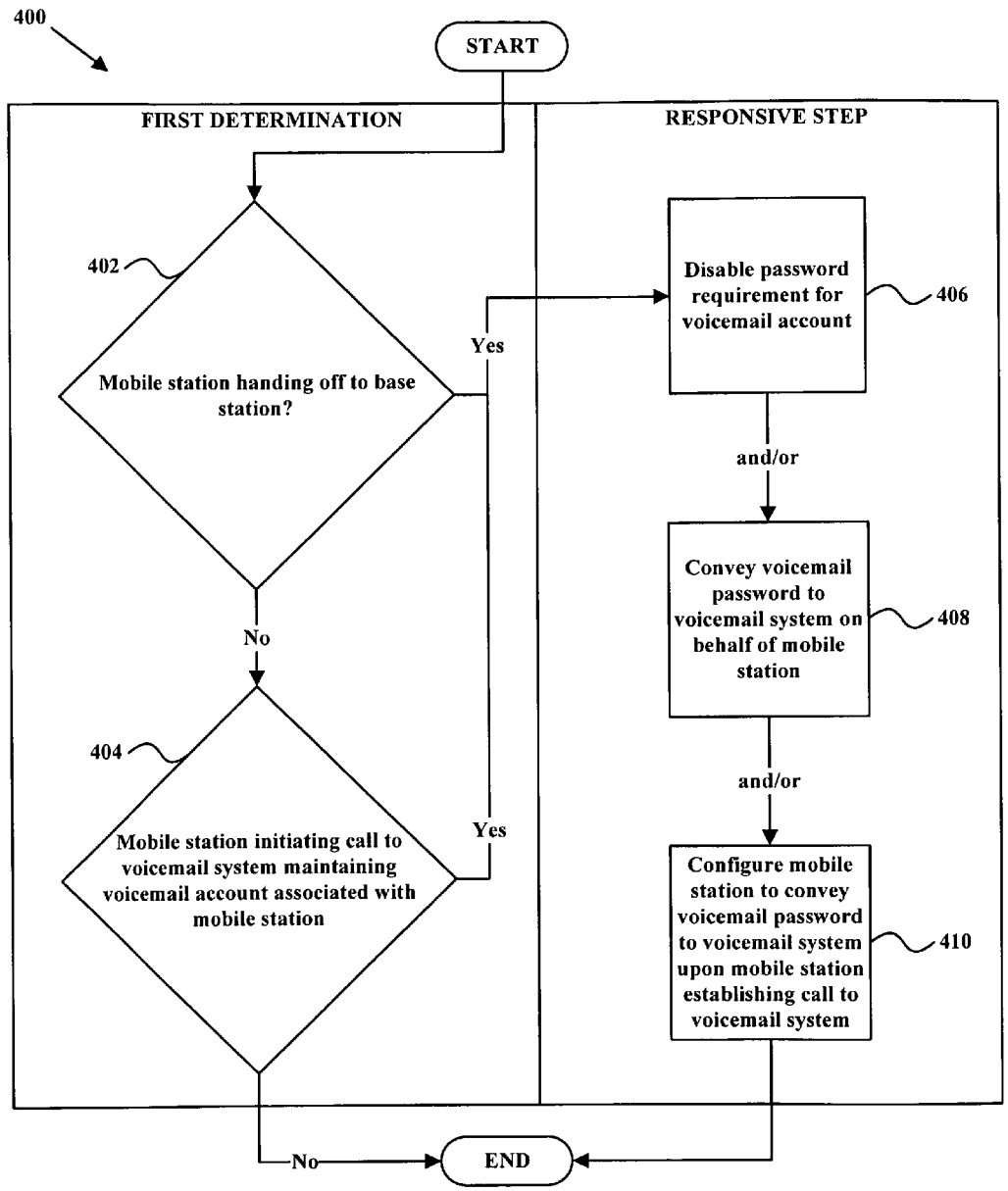
FIG. 4 is a flowchart of a method, in accordance with exemplary embodiments.

FIG. 4 is a flowchart of an exemplary embodiment, in the form of a method carried out by a base station, such as the LCIB depicted in FIG. 3. As shown in FIG. 4, the method begins with the base station making a first determination that at least one of events 402 and 404 has occurred. At step 402, the base station makes a determination that a mobile station, such as mobile station 102, has handed off to the base station. The mobile station does not need to be served exclusively by the base station of method 400; the mobile station could be concurrently served by other base stations, such as a macro base station, without departing from the scope of the invention. If the base station makes a determination that a mobile station has handed off to the base station, then the base station continues by carrying out at least one of first responsive steps 406, 408, and 410.

If, at step 402, the base station has not made a determination that a mobile station has handed off to the base station, then the method continues at step 404, where the base station makes a determination that the mobile station has initiated a call to a voicemail system maintaining a voicemail account associated with the mobile station. If the base station makes a determination that the mobile station has initiated such a call, then the base station continues by carrying out at least one of first responsive steps 406, 408, and 410.

It may be desirable that certain first responsive steps be carried out when the mobile station has initiated a call to a voicemail system, rather than when the mobile station has handed off to the base station. For example, it may be appropriate for the base station to convey the voicemail password to the voicemail system on behalf of the mobile station when the mobile station has initiated a call to the voicemail system. Other steps can be carried out either upon handoff, or upon initiating a call to the voicemail system, such as disabling a password requirement, or configuring the mobile station to convey the voicemail password to the voicemail system upon the mobile station establishing a call to the voicemail system.

If, at step 404, the base station has not made a determination that the mobile station has initiated a call to the voicemail system, then the base station has not made a first determination, and the method ends. The base station may continuously or periodically monitor whether a mobile station has handed off to the base station, or whether the mobile station has initiated a call to the voicemail system, and if at any time the base station makes a determination that either event has occurred, then the method continues by carrying out at least one of first responsive steps 406, 408, and 410.

In response to making the first determination, the base station may, at step 406, disable a password requirement for the voicemail account. Disabling the password requirement may comprise, for example, establishing a call to the voicemail system and transmitting one or more key inputs to the voicemail system. Such a call may comprise, for example, the base station (i) establishing the call and conveying the voicemail password to the voicemail system, (ii) navigating through a voice-prompted menu system on the voicemail system by transmitting one or more key inputs, and (iii) when prompted, transmitting key inputs corresponding to a menu option to disable a password requirement.

Additionally or alternatively, disabling the password requirement may comprise sending a message to a network entity to disable the password requirement. Such a message might be an SMS message, page message, or any other message capable of causing the network entity to disable the password requirement. The network entity might be, for example, LCIB controller 126, BSC 106, or any other network entity capable of disabling the password requirement. Those having skill in the art will recognize that there are numerous means for disabling a password requirement by sending a message to a network entity that are within the scope of the invention.

Additionally or alternatively, in response to making the first determination, the base station may, at step 408, convey the voicemail password to the voicemail system on behalf of the mobile station. Step 408 may occur after the base station has made a determination that the mobile station has initiated a call to the voicemail system. After the mobile station has initiated the call, but before the mobile station has access to the voicemail account, the base station may, in response to a prompt by the voicemail system, transmit dialed digits representing the voicemail password. Additional methods of conveying the voicemail password to the voicemail system on behalf of the mobile station are possible without departing from the scope of the invention.

Additionally or alternatively, in response to making the first determination, the base station may, at step 410, configure the mobile station to convey the voicemail password to the voicemail system upon the mobile station establishing a call to the voicemail system. In one embodiment, configuring the mobile station may comprise configuring the mobile station to, in response to initiating a call to the voicemail system, but before the mobile station has access to the voicemail account, transmit dialed digits representing the voicemail password. Configuring the mobile station may further comprise transmitting a voicemail password stored on the base station to the mobile station. Additionally or alternatively, the voicemail password may be stored on the mobile station. Other methods of configuring the mobile station are possible without departing from the scope of the invention.

The base station may optionally receive a voicemail password. Receiving the voicemail password may comprise, for example, the base station receiving the voicemail password from the mobile station. Receiving the voicemail password from the mobile station may comprise receiving from the mobile station dialed digits representing the voicemail password. In one embodiment, the mobile station, upon handing off to the base station, could ask the mobile-station user whether he or she wishes to disable the password requirement. If the mobile-station user answers affirmatively, then the mobile-station user would be prompted to enter dialed digits representing the voicemail password. Those dialed digits would then be transmitted to the base station.

In another embodiment, the mobile station, upon handing off to the base station, could ask the mobile-station user whether he or she wishes to disable the password requirement. If the mobile-station user answers affirmatively, the mobile station would retrieve the voicemail password stored on the mobile phone. The password may be stored on the phone as a result of the mobile-station user navigating through a menu system on the mobile station and specifying that a designated password should be transmitted to the base station upon the user answering affirmatively upon a handoff that he or she wishes to disable the password requirement.

In another embodiment, the mobile station, upon handing off to the base station, would automatically transmit the voicemail password to the base station. The password may be automatically transmitted as a result of the mobile-station user specifying that a designated password should be transmitted to the base station upon the mobile station handing off to the base station. These and other embodiments are provided only as examples, as other means for the base station receiving the voicemail password from the mobile station are possible without departing from the scope of the invention.

In another embodiment, receiving the voicemail password may comprise the base station receiving the voicemail password from a data storage connected to the base station. The data storage may be, for example, data storage 310 of LCIB 116. The password may be stored on data storage 310 as a result of receiving the password from the mobile station. For example, a mobile station, upon handing off to the base station for the first time after installation and set-up of the LCIB, may ask the mobile-station user whether he or she wishes to store the voicemail password on the base station. If the mobile-station user answers affirmatively, then the mobile-station user could be prompted to enter dialed digits representing the voicemail password. Those dialed digits would then be transmitted to the base station and stored in data storage 310. In another embodiment, if the mobile-station user answers affirmatively, then the mobile station would transmit a voicemail password stored on the mobile station to be stored on data storage 310.

The password may be stored on data storage 310 as a result of receiving the voicemail password from another device connected to LCIB 116, such as personal computer 120 communicatively connected to LCIB 116 through router 118. Data storage 310 might receive the voicemail password during installation and set-up of the LCIB. For example, a mobile-station user might configure the LCIB, including configuring the LCIB to disable the password requirement for the voicemail account, through personal computer 120 as part of the installation and set-up of the LCIB; the configuration settings would then be stored in data storage 310. Other methods of receiving the voicemail password for storage on the data storage are possible without departing from the scope of the invention.

Alternatively, the base station receiving the voicemail password may comprise the base station receiving the voicemail password from a network entity, such as LCIB controller 126, BSC 106, or any other network entity capable of transmitting the voicemail password to the base station. In order to prevent an unauthorized base station from receiving a voicemail password from a network entity, the base station might be authenticated before it receives the voicemail password. The base station might be authenticated by sending a machine-specific identifier, such as a serial number or Media Access Control (MAC) address, to the network entity. The sent machine-specific identifier would then be compared with values stored on or accessible to the network entity. If comparison of the machine-specific identifier with the stored values demonstrates that the base station is authorized to receive the voicemail password, then the base station receives the voicemail password from the network entity.

Receiving the voicemail password from a network entity may comprise data storage 310 receiving the voicemail password during installation and set-up of the LCIB. In another embodiment, receiving the voicemail password from a network entity may comprise receiving the voicemail password from the network entity after making the determination that a mobile station has handed off to the base station or that the mobile station has initiated a call to the voicemail system. The voicemail password may be stored in data storage 310, or the voicemail password may be received from a network entity after every subsequent handoff or every call to the voicemail system. Other methods of receiving the voicemail password from a network entity are possible without departing from the scope of the invention.

Figure 5:
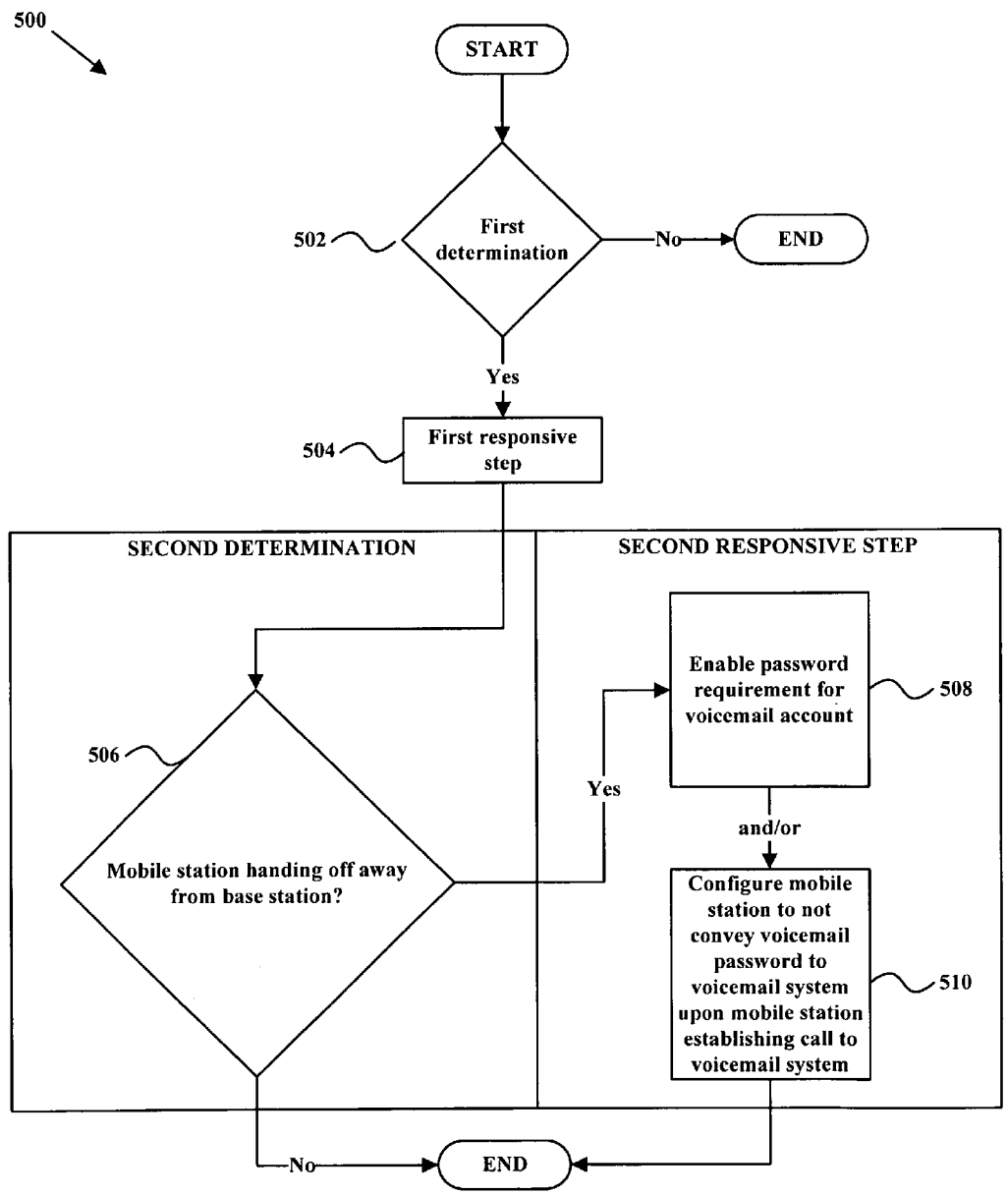
FIG. 5 is a flowchart of a method, in accordance with exemplary embodiments.

FIG. 5 is a flowchart of an exemplary embodiment, in the form of a method carried out by a base station, such as the LCIB depicted in FIG. 2. As shown in FIG. 5, the method 500 begins at step 502, where the base station makes a first determination that at least one of the events described above with respect to steps 402 and 404 has occurred. If the base station has not made a first determination, then the method ends. If, however, the base station has made a first determination, then the base station continues at step 504, where the base station carries out at least one of the first responsive steps described above with respect to steps 406, 408, and 410.

The method continues at step 506 with the base station making a second determination that the mobile station has handed off away from the base station. If the base station has not made a second determination, then the method ends. The base station may continuously or periodically monitor whether the mobile station has handed off away from the base station, and if at any time the base station makes a determination that the mobile station has handed off away from the base station, then the method continues by carrying out at least one of second responsive steps 508 and 510.

In response to making the second determination, the base station may, at step 508, enable the password requirement for the voicemail account. Enabling the password requirement may comprise steps similar to disabling the password requirement as described above with respect to step 406. For example, enabling the password requirement may comprise establishing a call to the voicemail system and transmitting one or more key inputs to the voicemail system. Additionally or alternatively, disabling the password requirement may comprise sending a message to a network entity to disable the password requirement.

Additionally or alternatively, in response to making the second determination, the base station may, at step 510, configure the mobile station to not convey the voicemail password to the voicemail system upon establishing a call to the voicemail system. Configuring the mobile station to not convey the voicemail password may comprise steps similar to configuring the mobile station to convey the voicemail password.

Figure 6:
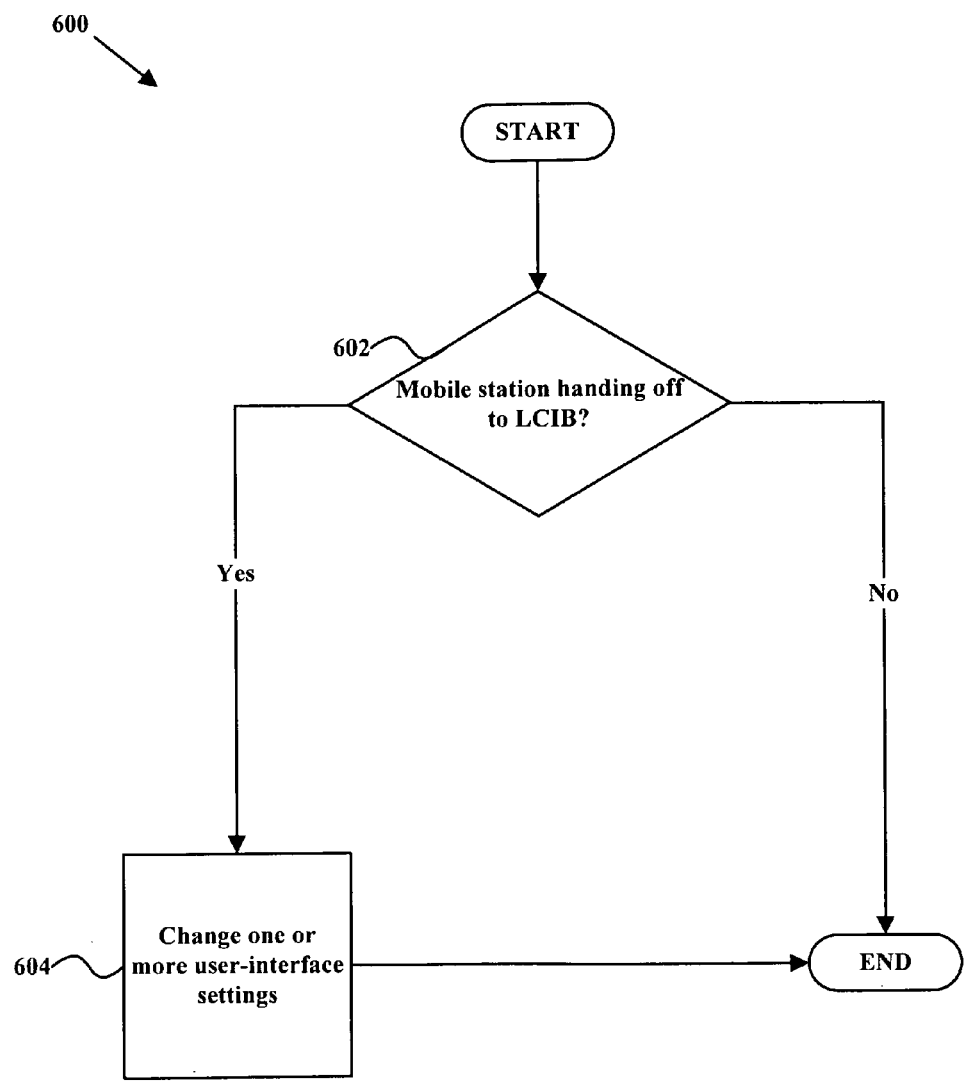
FIG. 6 is a flowchart of a method, in accordance with exemplary embodiments.

FIG. 6 is a flowchart of an exemplary embodiment, in the form of a method carried out by, for example, the LCIB depicted in FIG. 3. The method begins at step 602 by making a determination that a mobile station, such as mobile station 102, has handed off to the LCIB. The mobile station does not need to be served exclusively by the LCIB of method 500; the mobile station could be concurrently served by other base stations, such as a macro base station, without departing from the scope of the invention.

If, at step 602, the LCIB has not made a determination that a mobile station has handed off to the LCIB, then the method ends. The LCIB may continuously or periodically monitor whether a mobile station has handed off to the LCIB, and if at any time the LCIB makes this determination, then the method continues at step 604.

The method continues at step 604 by, in response to making the determination that the mobile station has handed off to the LCIB, changing one or more user-interface settings on the mobile station. Changing one or more user-interface settings may, for example, be initiated by the LCIB upon making a determination that the mobile station has handed off to the LCIB. Additionally or alternatively, changing one or more user-interface setting may be initiated by the mobile station upon the mobile station making a determination that the mobile station has handed off to the LCIB. Those having skill in the art will recognize that there may be other ways of initiating a user-interface change without departing from the scope of the claims; describing the LCIB or the mobile station as initiating the user-interface change is not limiting but rather exemplary in nature.

In another embodiment, the LCIB or the mobile station could make a determination that a mobile station has handed off away from the LCIB, and in response to making the determination, change one or more user-interface settings on the mobile station.

The one or more user-interface settings may comprise, for example, a ringtone setting. In one embodiment, the LCIB or the mobile station, in response to making a determination that the mobile station has handed off to the LCIB, would disable a ringtone and enable a vibrate setting. In another embodiment, the mobile station or the LCIB would enable a ringtone and disable a vibrate setting. In another embodiment, the LCIB or the mobile station might change the default ringtone for the mobile station. Those with skill in the art will recognize that other ringtone settings and changes are possible.

The one or more user-interface settings may comprise a volume setting. In one embodiment, the LCIB or the mobile station, in response to making a determination that the mobile station has handed off to the LCIB, would either increase a volume setting or decrease a volume setting. Other volume settings and changes are possible as well.

The one or more user-interface settings may comprise a display-picture setting. In one embodiment, the LCIB or the mobile station, in response to making a determination that the mobile station has handed off to the LCIB, would change a display picture. In another embodiment, the LCIB or the mobile station would disable a display picture, and/or enable a display picture. Other display-picture settings and changes are possible as well.

The one or more user-interface settings may comprise a wireless-protocol setting. In one embodiment, the LCIB or the mobile station, in response to making a determination that the mobile station has handed off to the LCIB, would enable a Wi-Fi interface on the mobile station by changing the wireless-protocol setting, allowing the mobile station, such as mobile station 102, to communicate with a Wi-Fi router, such as router 118, over a Wi-Fi connection. Alternatively, the LCIB or the mobile station would disable the Wi-Fi interface. The wireless protocol may be any protocol now known or later developed; use of the Wi-Fi protocol in this description is exemplary in nature. And other wireless-protocol settings and changes are possible.

The one or more user-interface settings may comprise a GPS setting. In one embodiment, the LCIB or the mobile station, in response to making a determination that the mobile station has handed off to the LCIB, would disable a GPS interface on the mobile station by changing the GPS setting. Alternatively, the LCIB or the mobile station would enable the GPS interface. Other GPS settings and changes are possible without departing from the scope of the invention.

4. Conclusion

Various exemplary embodiments have been described above. Those skilled in the art will understand, however, that changes and modifications may be made to those examples without departing from the scope of the claims.

The invention claimed is:
1. A method comprising:
   (a) a base station making a first determination that at least one of the following events has occurred:
      (i) a mobile station handing off to the base station; and
      (ii) the mobile station initiating a call to a voicemail system maintaining a voicemail account associated with the mobile station; and
   (b) in response to making the first determination, the base station carrying out at least one of the following first responsive steps:
      (i) disabling a password requirement for the voicemail account; and

(ii) configuring the mobile station to convey the voicemail password to the voicemail system upon the mobile station establishing a call to the voicemail system.

2. The method of claim 1, wherein disabling the password requirement comprises establishing a call to the voicemail system and transmitting one or more key inputs to the voicemail system.

3. The method of claim 1, wherein disabling the password requirement comprises sending a message to a network entity to disable the password requirement.

4. The method of claim 1, further comprising the base station receiving the voicemail password.

5. The method of claim 4, wherein receiving the voicemail password comprises receiving the voicemail password from the mobile station.

6. The method of claim 5, wherein receiving the voicemail password from the mobile station comprises receiving from the mobile station dialed digits representing the voicemail password.

7. The method of claim 4, wherein receiving the voicemail password comprises receiving the voicemail password from a data storage connected to the base station.

8. The method of claim 1, further comprising:
the base station making a second determination that the mobile station has handed off away from the base station; and
in response to making the second determination, the base station carrying out at least one of the following second responsive steps:
(i) enabling the password requirement for the voicemail account; and
(ii) configuring the mobile station to not convey the voicemail password to the voicemail system upon establishing a call to the voicemail system.

9. The method of claim 8, wherein enabling the password requirement comprises establishing a call to the voicemail system and transmitting one or more key inputs to the voicemail system.

10. The method of claim 8, wherein enabling the password requirement comprises sending a message to a network entity to enable the password requirement.

11. A low-cost Internet base station (LCIB) comprising:
a communication interface;
a processor; and
data storage comprising instructions executable by the processor to:
(a) make a first determination that at least one of the following events has occurred:
(i) a mobile station handing off to the LCIB; and
(ii) the mobile station initiating a call to a voicemail system maintaining a voicemail account associated with the mobile station; and (b) in response to making the first determination, carry out at least one of the following first responsive steps:
(i) disabling a password requirement for the voicemail account; and
(ii) configuring the mobile station to convey the voicemail password to the voicemail system upon the mobile station establishing a call to the voicemail system.

12. The LCIB of claim 11, wherein the instructions for disabling the password requirement comprise instructions for establishing a call to the voicemail system and transmitting one or more key inputs to the voicemail system.

13. The LCIB of claim 11, wherein the instructions for disabling the password requirement comprise instructions for sending a message to a network entity to disable the password requirement.

14. The LCIB of claim 11, wherein the data storage further comprises instructions for receiving the voicemail password.

15. The LCIB of claim 14, wherein the instructions for receiving the voicemail password comprise instructions for receiving the voicemail password from the mobile station.

16. The LCIB of claim 15, wherein the instructions for receiving the voicemail password from the mobile station comprise instructions for receiving from the mobile station dialed digits representing the voicemail password.

17. The LCIB of claim 14, wherein the instructions for receiving a voicemail password comprise instructions for receiving the voicemail password from a data storage connected to the LCIB.

18. The LCIB of claim 11, wherein the data storage further comprises instructions to:
make a second determination that the mobile station has handed off away from the LCIB; and
in response to making the second determination, carry out at least one of the following second responsive steps:
(i) enabling the password requirement for the voicemail account; and
(ii) configuring the mobile station to not convey the voicemail password to the voicemail system upon establishing a call to the voicemail system.

19. The LCIB of claim 18, wherein the instructions for enabling the password requirement comprise instructions for establishing a call to the voicemail system and transmitting one or more key inputs to the voicemail system.

20. The LCIB of claim 18, wherein the instructions for enabling the password requirement comprise instructions for sending a message to a network entity to enable the password requirement.

* * * * *